United States Patent Office 3,497,062
Patented Feb. 24, 1970

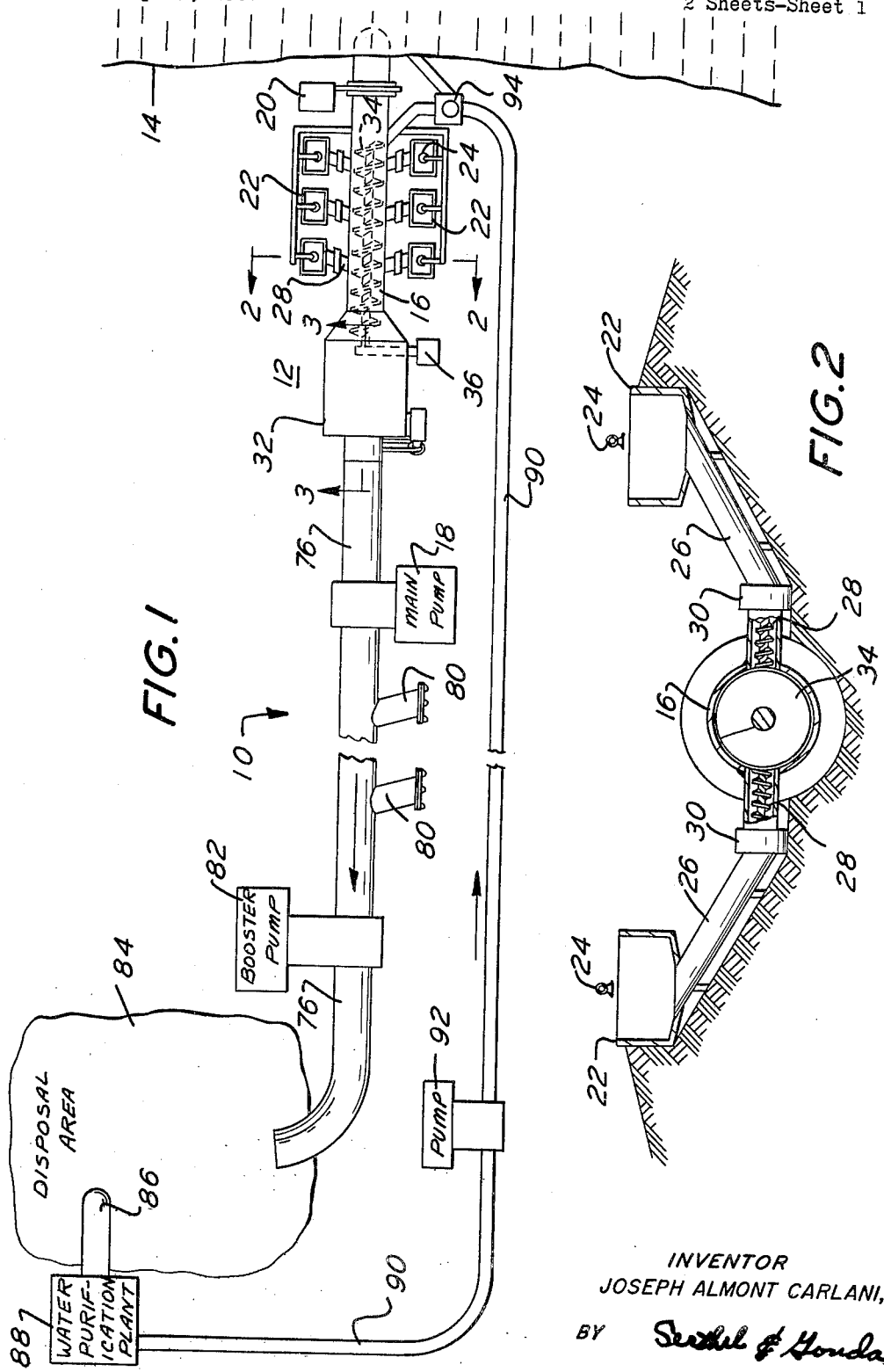
Feb. 24, 1970 — J. A. CARLANI, JR — 3,497,062
WASTE DISPOSAL SYSTEM
Filed July 19, 1967 — 2 Sheets-Sheet 1
INVENTOR
JOSEPH ALMONT CARLANI, JR.
ATTORNEYS.

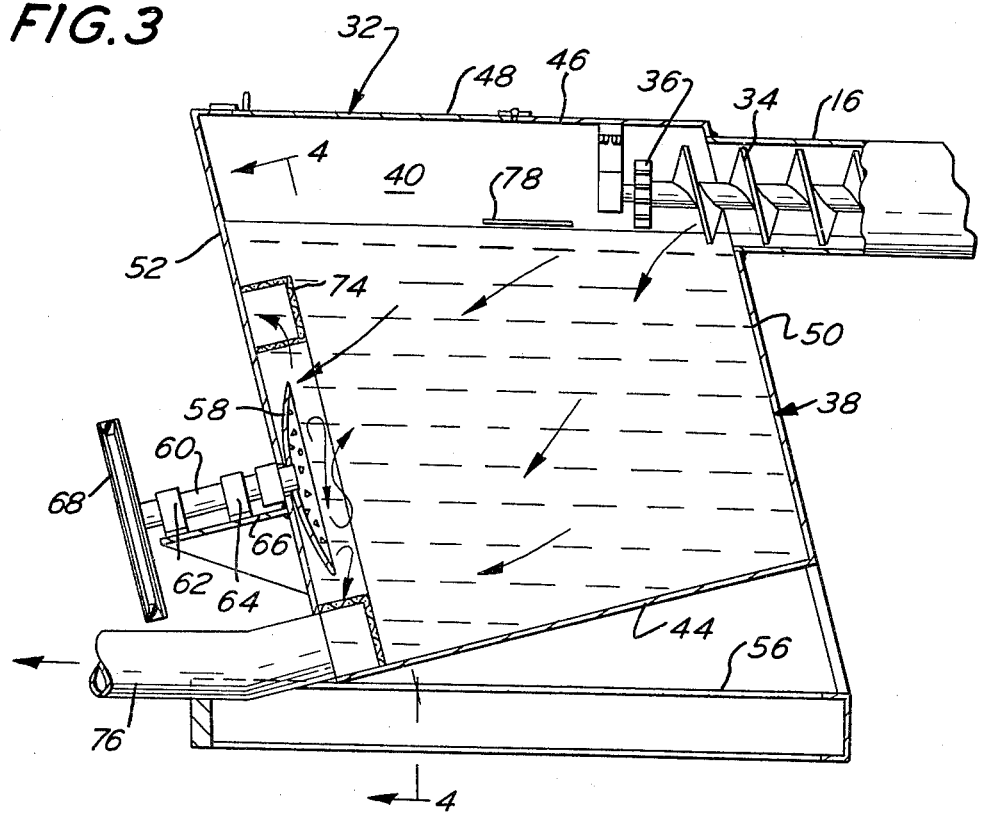
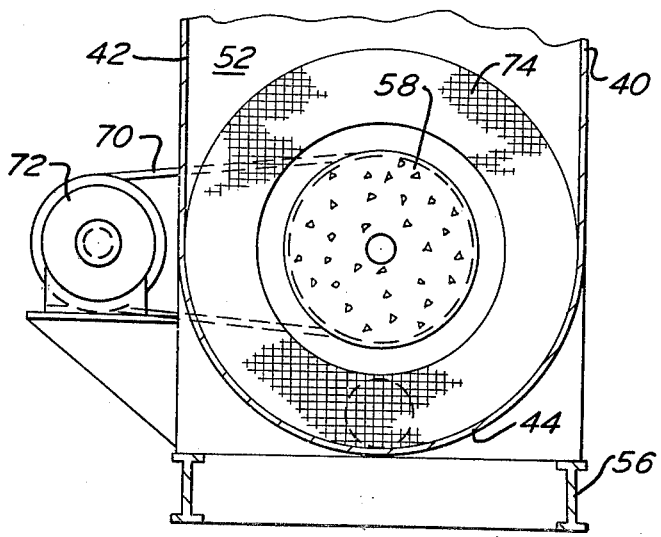

3,497,062
WASTE DISPOSAL SYSTEM
Joseph Almont Carlani, Jr., 47 E. 5th St.,
Burlington, N.J. 08016
Filed July 19, 1967, Ser. No. 654,592
Int. Cl. C02c 1/26
U.S. Cl. 210—70                             9 Claims

ABSTRACT OF THE DISCLOSURE

A waste disposal system including a soaking and pulverizing section adjacent a natural body of water, an extended conduit for conveying the pulverized waste and water to a waste disposal area remote from the soaking and pulverizing section and from urban areas, pumps to assist the flow of the sewage and water through the conduit, the waste disposal area being of the type where the water flows off, and a water purification plant for purifying the water and conducting it to a return conduit for returning the water to the soaking pit for re-use or into the source.

---

This invention relates to a waste disposal system. More particularly, this invention relates to a waste or sewage disposal system for use by one or more communities without resultant air pollution and without polluting the natural bodies of water and streams which provide water to the communities.

The disposal of waste in the form of sewage generated by the human race is as old as civilization itself. There are several systems for processing garbage which are currently in vogue. Among them are the processes which involve either incinerating the waste or in the alternative, processing it and then dumping it into natural bodies of water and streams. Both processes contribute heavily to the ever growing problem of pollution. The one contributes heavily to air pollution and the other contributes to water pollution.

The present waste disposal system is concerned with eliminating both air and water pollution. In accordance with the present invention, apparatus is provided for first soaking the waste and then grinding or mulching it to produce a slurry of pulverant waste and water. Thereafter, the slurry is conducted through a conduit to a settling pond which is remote from the receiving area, preferably by several miles. At the settling pond, the water is drained off and pumped back to the soaking pits after being purified in a water purification plant located at the site of the settling pits or at some intermediate point. The purified water can then be re-used for converting new sewage into a slurry or it can be returned to the source from which it was originally taken. The slurry and purified water are moved along their respective conduits by appropriate pumps and booster pumps. Since the waste has been pulverized, the capacity of the settling area is greatly increased. Moreover, top layers of soil can be readily used to cover the filled areas so that the land can be used thereafter.

For the purpose of illustrating the invention, there is shown in the drawings a form which is presently preferred; it being understood, however, that this invention is not limited to the precise arrangements and instrumentalities shown.

FIGURE 1 is a schematic view illustrating the proposed waste disposal system.

FIGURE 2 is a transverse sectional view of the waste disposal system illustrated in FIGURE 1, taken along the line 2—2.

FIGURE 3 is an enlarged partial sectional view of the system illustrated in FIGURE 1, taken along the line 3—3 and illustrating a hydropulper.

FIGURE 4 is a partial sectional view of the hydropulper illustrated in FIGURE 3 taken along the line 4—4.

Referring now to the drawings in detail, wherein like numerals indicate like elements, there is shown in FIGURE 1 a waste disposal system designated generally as 12.

The waste disposal system 10 comprises a soaking and pulverizing section indicated generally as 12. As best shown in FIGURES 1 and 2, the soaking and pulverizing section is preferably located adjacent the natural source of water 14 which may be a river, lake or the like. Water is drawn from the source 14 into the intake conduit 16 by the main pump 18. A gate valve 20 controls the flow of water into the pipe 16 and prevents the back flow of contaminated water into the source 14.

The soaking and pulverizing section 10 is provided with a plurality of soaking pits 22 which in the illustrated embodiment are positioned above the intake pipe 16 and have appropriate ramps whereby trucks or other waste conveyors may deposit the waste material into them. The waste is retained within the soaking pits 22 while high pressure overhead nozzles saturate the waste with water. The water for the soaking operation is derived from the conduit 16 and raised to the necessary pressure by appropriate pumps, not shown.

After the waste material is sufficiently saturated with water, it is permitted to flow by gravity down the feed conduits 26 and into the intake pipe 16. The rate and amount of saturated waste which is fed into the intake pipe 16 is controlled by the lateral feed screws 28 which are driven by appropriate motors 30.

Once it is passed into the intake pipe 16, the saturated waste is conveyed to a pulverizing apparatus 32, which in the preferred form is a hydropulper such as is conventionally used in paper making processes. The means for conveying the saturated waste is the longitudinal screw 34 which is rotatably mounted within the pipe 16 and driven by the motor 36.

The pulverizing apparatus 32 is best shown in FIGURES 3 and 4. It is the purpose of the pulverizing apparatus to convert the saturated waste into a slurry of water and pulverant which can be pumped to the disposal area. The pulverizing apparatus 32 is but one example of any number of such devices which can be used to accomplish the purposes of this invention. As shown, the saturated waste is fed by the screw 34 into the water filled tank 38 which houses the pulverizing apparatus. The tank 38 includes vertical side walls 40 and 42 which join a rounded bottom wall 44 that is disposed at an angle with respect to the horizontal. The tank 38 includes a top wall 46 with an access door 48 hinged thereto. The tank 38 also includes front and rear walls 50 and 52, respectively. The angle of inclination of the bottom wall is such that materials contained within the tank 38 tend to flow from the front wall toward the rear wall. The rounded bottom wall 44 causes the material to flow towards the center of the tank. The tank 38 is supported as described above on the support structure 56.

A grinding impeller 58 is rotatably mounted adjacent to rear wall 52. Impeller 58 is preferably a dish shaped device with projections of hardened metal or stone mounted thereon for grinding the saturated waste which impinges upon it. Impeller 58 is mounted on shaft 60 which is supported on bearings 62 and 64, in turn supported on plate 66. A pulley 68 is mounted on the end of shaft 60. Belt 70 engages pulley 68 and drives the same by means of motor 72 and an appropriate driving mechanism.

A strainer 74 in the form of an annulus surrounds the impeller 58 and provides communication for the slurry of water and pulverized waste to the conducting conduit 76. Conduit 76 makes communication with the tank 38 at its lowermost point, that is in the bottom of rear wall 52, abutting the lowest point in bottom wall 44. The size of the screening in strainer 74 is chosen so as to pass a pulverant within the slurry which is of sufficient size to be adequately handled by the pumps. The unground and partially ground waste is prevented from entering conduit 76 by the screen 74.

As shown in FIGURE 3, the saturated waste and sufficient water to maintain the level within tank 38 at the level stripe 78 is fed into the apparatus 32. The natural flow of the material within the tank is downwardly into the rear because of its shape and positioning of conduit 76. The waste swirls about and ultimately contacts the impeller 58 which grinds it. As soon as the pulverant has been reduced to the correct size, it passes through the screen 74 and into the conduit 76. This is a continuous process during the operation of the soaking and pulverizing section 12.

As indicated heretofore, the slurry is forced through conduit 76 by main pump 18, which preferably will be a trash type pump well known to those skilled in the art. Conduit 76 is preferably a steel pipe, welded at all joints. If desired, Y fittings can be spaced at intermediate points along conduit 76 so that other cities or disposal sections can tie into the main conduit 76 for the disposal of additional waste. Appropriate control valves (no shown) and booster pumps 82 are provided along the length of conduit 76 as needed. It is anticipated that the booster pumps are to be operated in the event that more than one community uses the disposal system with a common conduit 76.

The conduit 76 conveys the slurry of pulverized waste and water to a disposal area 84, which is a plurality of settling ponds.

The settling ponds in disposal area 84 will have sloping bottoms so that the water can be drained off, leaving the pulverized waste to settle within the ponds. Thus, an outlet pipe 86 can be positioned adjacent the lowest portion of each settling pond in the disposal area 84. The outlet pipe conducts the water or effluent from the settling pond to a water purification plant 88. Plant 88, is preferably located in the disposal area or adjacent thereto. However, it could be located in the soaking and pulverizing section or intermediate the disposal area and section 12. Purified water is pumped through conduit 90 by pump 92. Conduit 90 conveys purified water back to the soaking and pulverizing section 12 where it is re-used or, returns it to the water source 14. A control valve 94 is provided for directing the water either into intake conduit 16 or back to the source 14.

The operation of the waste disposal system should be obvious to those skilled in the art from the foregoing description of the operation of the various parts thereof. It is anticipated that the disposal area 84 will be placed in some remote and little used section of land. The soaking and pulverizing section 12, will of course be adjacent the source of water 14. By way of example, the soaking and pulverizing section 12 could be on the Delaware River somewhere between Philadelphia and the New York border. The conduit 76 could follow the right of way of the New Jersey Central Railroad to a site somewhere in the Jersey Pine Barrens. Such a system would be capable of handling the Philadelphia-Camden waste disposal as well as any community in the western portion of New Jersey.

The present invention may be embodied in other specific forms without departing from the spirit or essential attributes thereof.

What is claimed is:

1. A process for waste disposal comprising the steps of depositing waste in a soaking pit, soaking all the waste in the pit to saturate the same, mechanically conveying all the saturated waste to a pulverizer, providing a rotating pulverizer having a grinding face, contacting all of the waste against the grinding face of the pulverizer, mechanically pulverizing the saturated waste at least to a fineness that can be handled by a transport conduit, providing a disposal area well remote from the soaking pit, pulverizer and urban area, interconnecting the transport conduit with the pulverizer and the disposal area, conducting the pulverized waste and soaking liquid through the transport conduit to the disposal area, separating the soaking liquid from the pulverized waste at said area, permitting the waste to settle in the disposal area, and purifying said soaking liquid which has been separated from the pulverized waste to remove contaminants.

2. A process in accordance with claim 1 wherein said waste is saturated by soaking it in pits while simultaneously applying a high pressure liquid to the waste.

3. A process in accordance with claim 1 wherein waste is conducted to said disposal area from a plurality of soaking and pulverizing stations.

4. A process for waste disposal in accordance with claim 1, wherein the soaking step includes the step of providing water as the soaking liquid.

5. A process in accordance with claim 1, wherein said soaking liquid is water including the steps of obtaining the soaking liquid from a natural source, and returning the purified soaking liquid to the natural source.

6. A waste disposal system located in an urban area, comprising at least one soaking pit for receipt of waste, means for saturating all the waste in said pit with a liquid, grinding means having a rotating grinding face for pulverizing the waste for conduction by the flow of the liquid and waste, waste conduit means communicating said soaking means with said grinding means, mechanical conveying means in said waste conduit means for conveying all of said saturated waste to said grinding means, an elongated conduit for conducting said liquid and said pulverized waste from said grinding means to a separation area well remote from urban areas, said grinding means and said soaking pits, pump means for forcing said liquid and pulverized waste to flow along said elongated conduit, water purification means for purifying liquid separated from the pulverized waste at said area.

7. A waste disposal system in accordance with claim 6 wherein the elongated conduit includes a plurality of inlets for pulverized waste conducted by water.

8. A waste disposal system in accordance with claim 6 including a conduit for conducting purified water from said area to a natural resource, a pump for forcing said purified water along said conduit, and said water purification means being located at the inlet end of said conduit.

9. A waste disposal system in accordance with claim 6 wherein said soaking means comprises open soaking pits said waste conduit means including an intake pipe below the level of said pits and communicating therewith, means for introducing water into said pipe, said forcing means including a mechanical member for impelling the water and waste from said pipe to said grinding means, and high pressure nozzles for applying water to said waste while the waste is in said soaking pits.

References Cited

UNITED STATES PATENTS

| | | | |
|---|---|---|---|
| 2,141,979 | 12/1938 | Halvorson et al. | 210—195 X |
| 2,246,224 | 6/1941 | Streander | 210—152 |
| 2,270,869 | 1/1942 | Ditto et al. | 210—195 X |
| 2,359,004 | 9/1944 | Schlenz et al. | 210—195 X |
| 3,236,767 | 2/1966 | Ross et al. | 210—195 X |
| 3,276,994 | 10/1966 | Andrews | 210—73 X |

REUBEN FRIEDMAN, Primary Examiner

JOHN W. ADEE, Assistant Examiner

U.S. Cl. X.R.

210—83, 152, 170, 532